Figure 1:
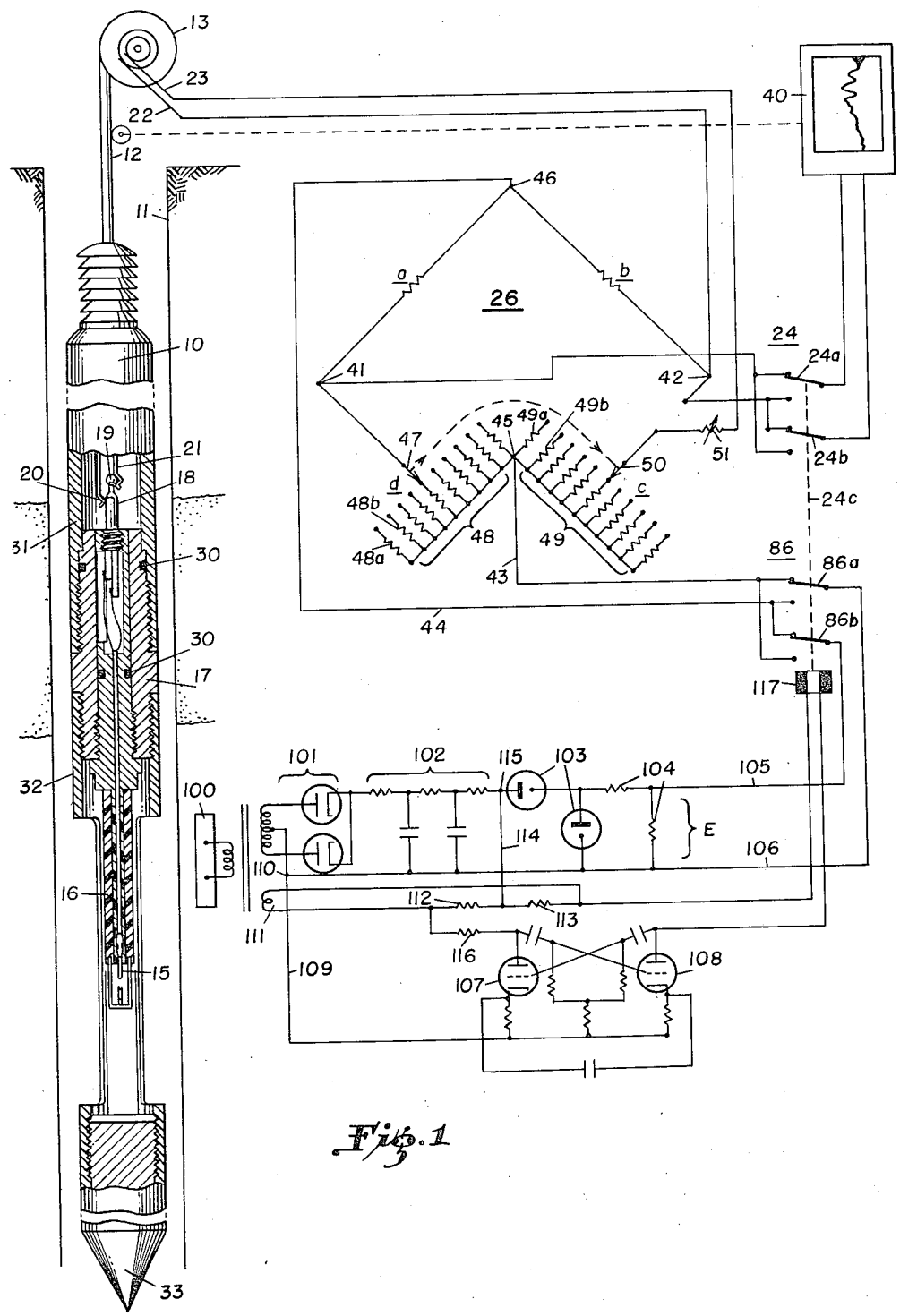

Dec. 11, 1962  J. K. GODBEY  3,068,447
BRIDGE MEASUREMENT OF HIGH BOREHOLE RESISTANCE
Filed Dec. 16, 1957  2 Sheets-Sheet 1

3,068,447
BRIDGE MEASUREMENT OF HIGH BOREHOLE
RESISTANCE
John K. Godbey, Dallas, Tex., assignor, by mesne assignments, to Socony Mobil Oil Company, Inc., New York, N.Y., a corporation of New York
Filed Dec. 16, 1957, Ser. No. 702,865
6 Claims. (Cl. 340—18)

This invention relates to the measurement of properties in a borehole and more particularly to the elimination of unwanted signals in connection with D.C. measurements of high resistances at the end of a borehole signal circuit.

Measurement of borehole temperatures and borehole pressures has been carried out by lowering a sensing element into a borehole at the end of a two conductor cable wherein one of the conductors comprises a metallic sheath encasing a central coaxial conductor. Such cables are employed because they best satisfy many stringent requirements that must be met in investigations made in the presence of the existing high pressures. Further, such cables are used to great advantages in view of their inherently small size. This feature permits the use of relatively light hoisting equipment and eliminates the great expense that is attendant the use of multichannel cables.

It has been found that where such cables are employed the presence of electrolytes in the borehole gives rise to difficulty. Such electrolytes cause the production of a voltage in the two conductor, signal-carrying circuit and may be considered effectively as a battery in series with the borehole circuit. Where D.C. bridge circuits are employed for carrying out measurements of high resistances which serve as the primary sensing element in the borehole circuit, the presence of the electrolyte induced potential often completely masks the effects sought to be measured.

It is an object of the present invention to provide a system in which measurements may be made based upon variations in a moderately high resistance element at the end of a borehole circuit in the presence of electrolyte induced potentials.

In accordance with the present invention there is provided in combination a borehole exploring circuit having a high resistance termination, which resistance is caused to vary in accordance with a condition in said well bore. A measuring system is provided responsive to variations in the resistance. A coupling circuit operates intermediate the cable circuit and the measuring means periodically to reverse the connection between the borehole exploring circuit and the measuring system at a rate which is high compared to the rate of variation in the resistance and at intervals which are short compared to the response time of the measuring system. By this means, induced potentials in the borehole circuit will be effectively eliminated permitting accurate measurement of resistance and variations therein.

Figure 2:
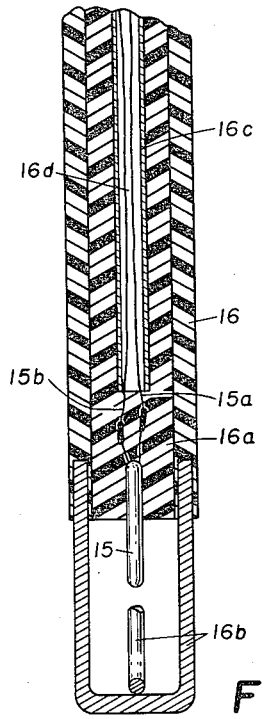
Figure 4:
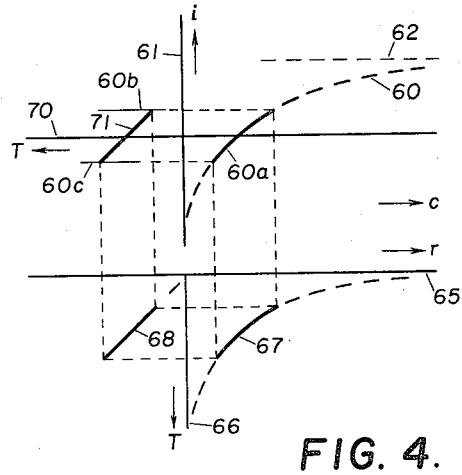
Figure 3:
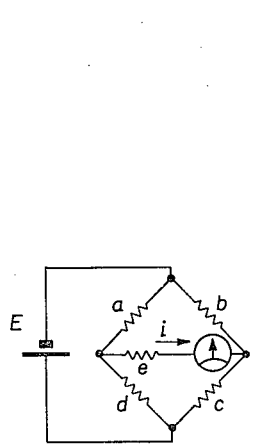
Figure 5:
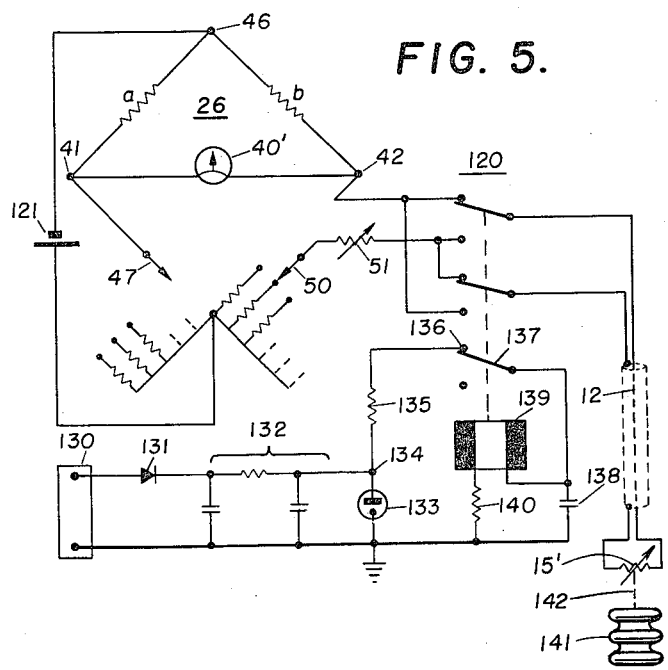

For a more complete understanding of the present invention and for further objects and advantages thereof, reference may now be had to the following description taken in conjunction with the accompanying drawings in which:

FIG. 1 is a diagrammatic view of the present invention;
FIG. 2 is a detailed sectional view of the borehole temperature sensing element;
FIG. 3 is a simplified bridge diagram;
FIG. 4 is a graphical representation of certain variables in the bridge circuit of FIGS. 1 and 3; and
FIG. 5 is a further modification of the invention.

Referring now to FIG. 1, there is illustrated a system for measuring borehole temperatures by the use of a temperature sensitive resistance which has a nominal resistance sufficiently high that substantial variations may be produced therein in response to temperature changes to permit high resolution in temperature measurements. In connection with such measurements there is illustrated in the system of FIG. 1 a provision for the elimination of unwanted potentials induced in the borehole circuit.

An exploring element 10 is positioned in a borehole 11 and supported by a cable 12 from a reel 13 for movement along the length of borehole 11. Reel 13 may be provided with suitable drive means (not shown) for conveniently controlling or selecting the depth at which the unit 10 may be located.

Unit 10 includes a temperature sensitive resistance 15 mounted in the end of a mandrel 16 which is threaded into a tubular support 17. A pair of conductors leading from the terminals of the sensitive element 15 extend through mandrel 16 and tubular support 17 and are terminated in the two terminals 18 and 19 of a telephone-type plug which cooperates with contacts 20 and 21 of a suitable jack. A circuit (not shown) then extends from contacts 20 and 21 through cable 12 to slip ring contacts 22 and 23 and thence one arm of a bridge circuit 26.

The borehole unit is so constructed that the chamber in which terminals 20 and 21 are located is fluid-tight. O-rings 30 are provided to prevent entry of borehole fluids through the associated threaded connections into the cylindrical chamber formed by the tube 31. A shield 32 threadedly engages the lower end of the cylindrical support 17 and has slotted walls in the region of element 15 to permit free ingress and egress of fluid in the sensing zone. The lower end of shield 32 is adapted to receive an end member 33 which may include weighting means to facilitate travel of the unit 10 downwardly through the borehole and to minimize turbulence upon flow of fluids upward past the unit 10.

As best illustrated in the detailed sectional view of FIG. 2, the temperature sensitive element may comprise a thermistor of the TX168 type, manufactured by Victory Engineering Company of Union, New Jersey, mounted in a resinous insulating mass 16a with the end thereof extending below the end of the mandrel 16. A protective cage 16b is provided to encompass the temperature sensitive element 15. Conductors 15a and 15b extend from the temperature sensitive element 15 through a steel sheath 16c which is swaged over filler 16d of magnesia which surrounds the conductors 15a and 15b. The steel sheath 16c extends through the mandrel 16 to provide a fluid-tight seal and feed-through for the conductors 15a and 15b.

From the foregoing it will be seen that the borehole unit has but a single active element, the temperature sensitive element 15. Two conductors lead from element 15 to the earth's surface. The borehole unit 10 is adapted to provide ready contact between temperature sensitive element 15 and the borehole fluids so that variations in resistance will be applied to the bridge.

Bridge circuit 26 is designed to permit accurate determination of the temperature in the borehole by surface indicating means and more particularly by the bridge unbalance current flowing through a meter or a recorder 40 as shown in FIG. 1. The recorder 40 is connected across the first or horizontal diagonal of the bridge, i.e., between terminals 41 and 42 by way of a double pole, double throw switch 24 whose function will hereinafter be described. A D.C. source of current is connected across a second diagonal of bridge circuit 26 by means of conductors 43 and 44 leading to terminals 45 and 46. A resistance (a) is connected in the arm of the bridge between terminals 41 and 46. A resistance (b) is connected in the arm of the bridge between terminals 42 and 46. Resistor arms (a) and (b) ordinarily are referred to as the ratio arms of a Wheatstone bridge. The rheostat or variable arm of the Wheatstone bridge is arm (*d*) which is formed by a switch armature 47 which is adapted to be connected to any one of several resistances in the resistor bank 48. A similar bank of resistances 49 is provided in the unknown arm (*c*) of the bridge. A switch armature 50 is connected in series with a variable resistance 51 in the unknown arm (*c*).

One terminal of variable resistance 51 is connected to the slip ring contact 23. Terminal 42 of bridge 26 is connected to slip ring contact 22. With the circuit thus completed, the unknown arm of bridge 26 includes temperature sensitive element 15 and the circuit including conductors in cable 12 leading to reel 13, the circuit including slip ring contacts 22 and 23, variable resistance 51, switch armature 50, and a selected one of the resistances in the resistor bank 49.

As will hereinafter be shown, the bridge is so designed through the provision of resistor banks 48 and 49 that unbalance operation may be employed to indicate temperature of fluids in the borehole accurately and linearly. In the measurement of such borehole temperatures with extreme accuracy, it is desirable that the nominal resistance of the temperature sensing element 15 be made sufficiently high and sufficiently sensitive to borehole temperatures that substantial variations in resistance may be produced for small variations in temperature. Such is the characteristic of the above-identified thermistor.

In order to make such measurement with the accuracy desired, unwanted potentials must be eliminated. Such potentials are believed to be produced by the passage of cable 12 and the unit 10 into electrolyte solutions such as salt water in a well bore. Such potentials have no relationship to the parameter under measurement. Heretofore, though the potentials have not been thoroughly understood, they have been of such a nature as to preclude measurements of high resistances at the end of two conductor cables of the type herein described.

In order to eliminate such unwanted potentials and in accordance with the present invention, there is provided in FIG. 1 means for periodically reversing the polarity of voltage applied to terminals 45 and 46 and for synchronously reversing the connection between the bridge 26 and the recorder 40. Switch 24 having switch arms 24*a* and 24*b* actuated by the linkage 24*c* is effective periodically to reverse connection between recorder 40 and bridge 26 at intervals which are short compared to the period of the recorder 40. Switching transients will thus be eliminated and the average value of bridge unbalance will be due solely to variation in the resistance of element 15.

Conductors 43 and 44 leading to terminals 45 and 46 of the bridge are connected to a suitable D.C. voltage source by way of a second double pole, double throw switch 86. A circuit leading from switch armatures 86*a* and 86*b* is connected to the D.C. voltage source. The coupling 24*c* is effective simultaneously to actuate switch arms 24*a* and 24*b*, 86*a* and 86*b*.

The circuit for deriving the drive voltage E for the bridge and for actuating the reversing switch 86 includes an alternating voltage source 100 connected to a full-wave rectifier 101 whose output is passed through a suitable filter 102 to voltage regulating tubes 103. The regulated output is then applied to a dividing network 104 so that a unidirectional voltage E is applied by way of conductors 105 and 106 to armatures 86*a* and 86*b*.

A bistable multivibrator including tubes 107 and 108 is connected from the cathode circuit thereof by way of conductor 109 to the ground conductor or negative terminal 110 of the power supply. An alternating voltage derived from source 100 by way of transformer secondary winding 111 is connected across series resistors 112 and 113. The juncture between resistances 112 and 113 is connected by way of conductor 114 to the B+ terminal 115 of the power supply. Resistance 112 is connected by way of resistance 116 to the anode of tube 107. Resistance 113 is connected by way of the relay actuating coil 117 to the anode of tube 108. Resistance 116 preferably is the same as that of the relay coil 117 so that, insofar as the multivibrator is concerned, a balanced circuit is maintained. The introduction of the alternating voltage from transformer winding 111 into the anode circuits of the multivibrator provides the synchronization for periodically switching conduction between tubes 107 and 108 for the actuation of the switch 86. Thus the rate of switching is at the frequency of subharmonic of the alternating voltage from source 100.

By operations of the foregoing type, highly accurate measurements of borehole temperatures now to be described may readily be made even though there may be present in the borehole circuit voltages which except for the provisions of the present invention would prevent measurements.

In connection with operation of the bridge circuit, it is known that Wheatstone bridges are widely used primarily because of the accuracy with which measurements of impedance may be made at the null point. With the bridge balanced, the value of resistance of the rheostat arm is taken as an indication of the value of the resistance in the unknown arm.

In contrast with null type measurements, the unbalance current flowing in the first diagonal of the bridge and through the recorder 40 is regulated so that over a limited range the unbalance current is substantially linear with respect to bore-hole temperature. This is true even though the operating characteristic of such a bridge is non-linear and even though the temperature-resistance characteristic of the temperature sensing element 15 is non-linear.

It will be of assistance in understanding the operation of the bridge to refer to FIGS. 3 and 4. The unbalance current (*i*), FIG. 3, flowing through the first diagonal of the bridge may be expressed in the following manner:

$$i = \frac{Ac - B}{Cc + D} \quad (1)$$

where $A = aE$
$B = bdE$
$C = b(a+d) + ad + ae + de$
$D = b(ad + ae + de)$ and where (*a*), (*b*), (*c*) and (*d*) represent the magnitude of the resistance in the ratio arms, the unbalance arm and the rheostat arm, respectively, (*e*) represents the magnitude of the resistance in the detecting diagonal, and E, the magnitude of the applied voltage.

In FIG. 4 there is plotted a first curve 60 which represents variation in current (*i*) as a function of variations in resistance (*c*), the unknown arm of the bridge. Curve 60 may be derived and plotted from Equation 1. If the resistance (*c*) is of zero value, then the first term in both numerator and denominator in Equation 1 becomes the ratio of $-B/D$. Curve 60 would thus have such an intercept on the axis 61. If Equation 1 is modified to the following form $$i = \frac{A - \dfrac{B}{c}}{C + \dfrac{D}{c}} \quad (2)$$

and if the unknown resistance (*c*) is infinitely large, the second terms of both numerator and denominator become vanishingly small and the unbalance current (*i*) is equal $A/C$. Thus, the maximum value of unbalance current as approached by curve 60 and represented by the dotted line 62, has a value equal to the ratio $A/C$.

Although the curve is non-linear, it is desired to produce an indication on recorder 40 which is substantially linear in terms of temperature. To achieve such operation, a limited range of bridge unbalance current is selected, such as represented by the solid portion 60a of curve 60.

More particularly, the lower portion of FIG. 4 represents a plot of the variation of resistance (r) of unit 15 along axis 65 as a function of temperature T which is plotted along axis 66. This curve is descriptive of a particular temperature sensing element. The term (r) as used herein may comprise the resistance of the sensing element plus the resistance of the cable only, or may also include resistance which is connected in series or parallel with the cable at terminals of the bridge circuit.

Curve 67 is non-linear but is such that in operation the effect thereof on bridge unbalance current is complementary to the bridge unbalance curve 60 so that the unbalance currents may be substantially linear in terms of temperature. That portion of curve 67 which represents the same change in resistance as the bridge unknown resistance (c) is represented by the solid portion of the curve. By projecting the values of curve 67 to the diagonal 68 and thence upwards to intersect the limit lines 60b and 60c of the curve segment 60a, a substantially linear function of unbalance current (i) is obtained as a function of borehole temperature T. It will be noted that unbalance current (i) has been plotted along axis 61. It has been found that over a somewhat limited range of unbalance current, linear operation may be thus achieved, the linear characteristic being represented by the line 71.

Having thus determined the range between maximum current value 60b and a minimum current value 60c, the banks of resistances 48 and 49, FIG. 1, in the unknown arm and the variable arm of bridge 26 may be selected.

It should be noted that the selector contact arms 47 and 50 are adapted to be moved sequentially along resistor banks 48 and 49 preferably simultaneously to vary the impedance in arms (c) and (d) of bridge 26. The variation in resistance thus effected in the bridge arms (c) and (d) preferably is such that the change in each step along resistor banks 48 and 49 will produce a change in current in the horizontal bridge diagonal of magnitude equal to the difference between the currents at limits 60c and 60b of FIG. 4. By this means a wide temperature range to which the element 15 is subjected may be covered stepwise by selecting segments through operation of the switch arms 47 and 50. In terms of the graph of FIG. 4, actuation of switch arms 47 and 50 serves to move curve 60 up or down to bring a new segment of the curve 60 into the range of unbalance currents 60b—60c and substantially to match the curvature of the corresponding portion of the resistance of the temperature sensing element.

The values of the resistances in the banks 48 and 49 may be computed from Equation 1 so that the entire temperature range T may be covered by bridge 26 in steps of any suitable increment. In practice it has been found wholly satisfactory to use empirical methods in the selection of the values of the resistances in the bridge. In one embodiment a range of borehole temperatures from 60° F. to 260° F. was covered in steps of 20° by suitable selection of the resistances in banks 48 and 49.

The mode of selecting the resistances was as follows. A calibrating resistance was substituted in place of element 15 at the end of cable 12 as by connecting it to terminals 20 and 21, FIG. 1. The calibrating resistor was adjusted to have the value representative of a temperature of 60° on curve 67. The resistances 48a and 49a were then adjusted to have such values that the indicator on recorder 40 was at one end, i.e., the zero end, of its scale.

The calibrating resistor was then adjusted to the value found on curve 67 representative of a temperature of 80°. The resistor 49a was then adjusted so that the indicator of recorder 40 was at the other end of its scale. At this point a first approximation to the correct value for resistors 48a and 49a was achieved. Thereafter the calibrating resistor was changed back to the value indicated on curve 67 for a temperature of 60°. Since the first setting of resistors 48a and 49a was approximate, the indicator on recorder 40 was not, and generally would not be, at the zero end of its scale. Resistor 48a was then adjusted again so that the indicator on meter 40 was at zero. The calibrating resistor was again changed to the value representative of an 80° temperature and resistor 49a was again adjusted. By successive adjustments of resistors 48a and 49a while alternating the values of the calibrating resistor from a 60° value to an 80° value, respectively, precise values for resistors 48a and 49a were determined. Switch arms 47 and 50 were then moved to connect resistors 48b and 49b in the circuit. The same procedure was then followed utilizing values of the calibrating resistor representative of 80° and 100° values taken from curve 67. Switch arms 47 and 50 were then moved successively to include all of the other pairs of resistances 48 and 49 in the bridge circuit to provide a calibration of the bridge for the complete range of temperatures represented by the curve 67.

Resistance 51 connected in series with the cable circuit in the unknown arm (c) of the bridge 26 is provided to compensate for variations in resistance of various borehole cables with which the system might be employed. The resistance 51 was selected to have such value that adjustments could be made therein so that the sum of the resistance of the cable and resistance 51 would total an arbitrary predetermined value. Since the borehole unit 10 and the measuring circuit including bridge 26 could readily be transported from place to place for use with various cables, each logging operation would be preceded by the initial adjustment of resistance 51 with terminals of the cable, such as terminals 20 and 21, short-circuited.

In FIG. 5 there is illustrated a system for measuring borehole pressure. In this case, the connection between the borehole circuit and measuring bridge is periodically reversed whereas in FIG. 1 the bridge current source and the bridge measuring system connections were periodically reversed.

In the pressure measuring system of FIG. 5, a variable resistance 15' is controlled through linkage 142 by a pressure sensitive bellows 141. The resistance 15' and bellows 141 may be supported by a borehole unit such as unit 10 with the bellows 141 exposed to borehole pressures. As a result, the variable resistance 15' may be made to vary in response to variations in borehole pressures. Such resistance will then appear at the armatures of switch 120 at the input of the bridge 26. In this case the voltage for operating bridge 26 may be derived from a battery 121 and the meter 40' or, alternatively, a recorder such as recorder 40, FIG. 1, is connected directly across the horizontal bridge diagonal, i.e., to points 41 and 42. By actuation of switch 120 the unwanted potentials which may appear between the outer conductor and the center conductor of cable 12 will be eliminated. In the system of FIG. 5 the switch 120 is actuated by means including an alternating voltage source 130 which is connected through a rectifier 131 to a filter 132. A voltage regulator tube 133 is connected between filter output terminal 134 and ground. Resistance 135 is connected between terminal 134 and switch terminal 136. Switch arm 137 is connected by way of condenser 138 to ground and by way of relay coil 139 and resistor 140 to ground. The time constant of the circuit of relay coil 139 is so selected that the armatures of switch 120 including armature 137 simultaneously will be actuated at intervals which are short compared to the period of the meter 40'. In either case, unwanted potentials are eliminated and accurate temperature measurements are provided.

The system comprising the adjustable feature of the bridge network 26 and operation thereof are described and claimed in the copending application of Hayden D. Hodges and James T. Dean, coworkers of applicant, Serial No. 702,929, filed December 16, 1957, now U.S. Patent No. 3,044,298, issued July 17, 1962.

While the invention has been described in connection with certain specific embodiments thereof, it will now be understood that further modifications will suggest themselves to those skilled in the art and it is intended to cover such modifications as fall within the scope of the appended claims.

What is claimed is:

1. In a system having a conductor and a conductive metallic sheath forming a signal circuit for extending into a well bore where immersion in an electrolyte results in generation of a cable potential, the combination which comprises a high resistance for terminating one end of said circuit and adapted to be varied in response to variations in a condition in a borehole, a bridge circuit to be located at the earth's surface, a source of bridge current and a detector of bridge current, a first connecting means for coupling said source and said detector to said bridge circuit for establishing bridge current and detecting unbalance bridge current, second means for connecting the other end of said signal circuit to the unknown arm of said bridge circuit, and circuit means for reversing the polarity of one of said connecting means relative to the polarity of the other connecting means at time intervals which are short compared to the period of said detector whereby the average current in said detector will be substantially entirely due to said source of bridge current and will be independent of said cable potential in order to permit accurate measurement of said high resistance in the presence of such cable potential.

2. In a system having a conductor and a conductive metallic sheath forming a signal circuit for extending into a well bore where immersion in an electrolyte results in generation of a cable potential, the combination which comprises a high resistance for terminating one end of said circuit and adapted to be varied in response to variations in a condition in a borehole, a bridge circuit to be located at the earth's surface, a source of bridge current and a detector of unbalance bridge current, a first set of connections for coupling said source and said detector to said bridge circuit for establishing bridge current and detecting bridge unbalance current, a second set of connections for connecting the other end of said singal circuit to the unknown arm of said bridge circuit, and circuit means for reversing the polarity of said first set of said connections relative to the polarity of said second set of connections at time intervals which are short compared to the period of said detector whereby the average current in said detector will be substantially entirely due to said source of bridge current and will be independent of said cable potential in order to permit accurate determination of said high resistance in the presence of such cable potential.

3. In a system having a conductor and a conductive metallic sheath forming a signal circuit for extending into a well bore where immersion in an electrolyte results in generation of a cable potential, the combination comprising a high resistance for terminating one end of said circuit and adapted to be varied in response to variations in a condition in a borehole, a bridge circuit to be located at the earth's surface, a source of bridge current and a detector of unbalance bridge current, a first set of connections for coupling said source and said detector to said bridge circuit for establishing bridge current and detecting bridge unbalance current, a second set of connections for connecting the other end of said signal circuit to the unkown arm of said bridge circuit, and means for reversing the polarity of said second set of said connections relative to the polarity of said first set of connections at time intervals which are short compared to the period of said detector whereby the average current in said detector will be substantially entirely due to said source of bridge current and will be independent of said cable potential in order to permit accurate determination of said high resistance in the present of such cable potential.

4. In a system having a conductor and a conductive metallic sheath forming a signal circuit for extending into a well bore where immersion in an electrolyte results in generation of a cable potential, the combination which comprises a high resistance for terminating one end of said circuit and adapted to be varied in response to variations in a condition in a borehole, a Wheatstone bridge circuit to be located at the earth's surface, a D.C. source of bridge current and a detector of unbalance bridge current, a first set of connections for connecting said source across one diagonal of said bridge circuit with a given polarity and for connecting said detector across the other diagonal of said bridge, a second set of connections for connecting the other end of said signal circuit to the unknown arm of said bridge circuit, and means for reversing the polarity of one set of said connections relative to the polarity of the other set of said connections at time intervals which are short compared to the period of said detector whereby the average current in said detector will be substantially entirely due to said source of bridge current and will be independent of said cable potential in order to permit accurate determination of said high resistance in the presence of such cable potential.

5. A system for measuring a high resistance in a well bore comprising a conductor and a conductive metallic sheath forming a signal circuit for extending into said well bore where immersion in electrolytic fluids results in generation of a cable potential, means for connecting said high resistance to one end of said circuit, a bridge circuit to be located at the earth's surface, a D.C. source of bridge current and a detector of unbalance bridge current, a first set of connections for coupling said source and said detector to said bridge circuit for establishing current flow in said bridge and for detecting bridge unbalance current, a second set of connections for connecting said signal circuit at the other end thereof to the unknown arm of said bridge circuit, and means for reversing the polarity of one set of said connections relative to the polarity of the other set of said connections at time intervals which are short compared to the period of said detector whereby the average current in said detector will be substantially entirely due to said source of bridge current and will be independent of said cable potential in order to permit accurate measurement of said high resistance in the presence of such cable potential.

6. The combination of a conductor and a conductive metallic sheath forming a signal circuit for extending into a well bore where immersion in an electrolyte results in generation of a cable potential, a high resistance terminating one end of said circuit and adapted to be varied in response to variations in a condition in a borehole, circuit means including a current detector connected to the other end of said circuit, means for producing a first component of unidirectional current for flow through said detector which component is dependent upon the magnitude of said high resistance, said detector also having a second component of current flow dependent in direction and magnitude upon said cable potential, and means for reversing the direction of said second component in said detector at time intervals which are short compared to the period of said detector whereby the average current in said detector will be substantially entirely due to said first component of current and will be independent of said cable potential in order to permit accurate determination of said high resistance in the presence of such cable potential.

References Cited in the file of this patent

UNITED STATES PATENTS

| | | |
|---|---|---|
| 1,665,397 | Wunsch | Apr. 10, 1928 |
| 2,199,705 | Karcher | May 7, 1940 |
| 2,517,455 | Waters | Aug. 1, 1950 |
| 2,569,867 | Norelius | Oct. 2, 1951 |
| 2,689,336 | McMillan | Sept. 14, 1954 |
| 2,743,414 | Ferre | Apr. 24, 1956 |